United States Patent
Panje (10) Patent No.: US 10,097,506 B2
(45) Date of Patent: Oct. 9, 2018

(54) ADDRESS ASSIGNMENT FOR VARIOUS CLIENT TYPES

(71) Applicant: ARRIS Enterprises LLC, Suwanee, GA (US)

(72) Inventor: Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 288 days.

(21) Appl. No.: 15/204,082

(22) Filed: Jul. 7, 2016

(65) Prior Publication Data

US 2017/0019372 A1 Jan. 19, 2017

Related U.S. Application Data (60) Provisional application No. 62/191,723, filed on Jul. 13, 2015.

(51) Int. Cl.

| G06F 15/16 | (2006.01) |
|---|---|
| H04L 29/12 | (2006.01) |
| H04L 29/06 | (2006.01) |
| H04L 29/14 | (2006.01) |
| H04L 12/701 | (2013.01) |

(52) U.S. Cl.
CPC .......... H04L 61/2015 (2013.01); H04L 45/00 (2013.01); H04L 65/601 (2013.01); H04L 67/42 (2013.01); H04L 69/40 (2013.01)

(58) Field of Classification Search
CPC .......... H04L 61/20; H04L 65/60; H04L 67/42
USPC .................................................. 709/245
See application file for complete search history.

(56) References Cited

U.S. PATENT DOCUMENTS

| 7,152,117 B1* | 12/2006 | Stapp ................ H04L 29/12273 709/245 |
|---|---|---|
| 7,925,772 B2* | 4/2011 | Fujita .................. H04L 12/2807 709/231 |
| 9,906,575 B2* | 2/2018 | Farrell ................... H04L 65/608 |
| 2011/0176555 A1* | 7/2011 | Poder .................... H04L 65/605 370/463 |
| 2014/0341109 A1* | 11/2014 | Cartmell .............. H04L 45/308 370/328 |
| 2017/0019372 A1* | 1/2017 | Panje .................. H04L 61/2015 |

* cited by examiner

Primary Examiner — Glenford J Madamba
(74) Attorney, Agent, or Firm — Bart A. Perkins (57) ABSTRACT

Methods, systems, and computer readable media can be operable to facilitate dynamic address assignment for various client types. A multimedia device may attempt to assign an IP address to a client device according to a received DHCP discovery message. In the event a DHCP discovery message is not received, the multimedia device may attempt DHCP assignment using an associated DHCP server. If no DHCP server is available, the multimedia device may recognize any multiple interface routing conflicts for a link-local range. If multiple interfaces exist within the link-local range, then the multimedia device may initiate a manual IP configuration of the client device. If no multiple interface routing conflicts exist, the multimedia device may configure a standard link-local DLNA network for streaming content to the client device.

15 Claims, 5 Drawing Sheets

ADDRESS ASSIGNMENT FOR VARIOUS CLIENT TYPES

CROSS REFERENCE TO RELATED APPLICATION

This application is a non-provisional application claiming the benefit of U.S. Provisional Application Ser. No. 62/191,723, entitled "Enhancements to Customer Premise Equipment Digital Media Server to Client Streaming," which was filed on Jul. 13, 2015, and is incorporated herein by reference in its entirety.

TECHNICAL FIELD

This disclosure relates to assigning an address to connected clients of various types.

BACKGROUND

The advent of networked client devices (e.g., devices that are connected to a common network), such as Digital Living Network Alliance (DLNA) devices, within the home has created a mixture of different interfaces through which subscribers may consume multimedia.

Customer premise equipment (CPE) devices such as gateway products and set-top boxes (STB) provide Internet protocol (IP) Digital Living Network Alliance (DLNA) streaming of content to IP client STBs and other client devices within a premise. The content can be live (linear) or recorded and may be designated by a uniform resource identifier (URI). The typical channel tuning by an IP client is achieved by doing a HTTP Get on a published URI by the gateway. Gateways as well as IP high-definition (HD) set top boxes (STB) can also stream content to standard retail IP clients (e.g., gaming devices, tablets, mobile devices, etc.) using DLNA. Typically, the gateway/DVR (digital video recorder)/STB takes the role of a DMR (digital media renderer) and the retail client takes the role of a DMP (digital media player) per DLNA nomenclature. STBs may be required to offer media transport with discovery and remote control pass through using open industry standards for home networking. For example, CPE devices such as HD STBs/gateways may be required to source content streams to networked devices using open standards (e.g., DLNA).

Typically, because of the wide variety of potential differences between client devices, many issues are encountered when attempting to implement DLNA streaming from CPE devices to one or more client devices. For example, normally, for IP (Internet protocol) addressing in DLNA, the DMS (gateway/DVR/STB) can provide DHCP (dynamic host configuration protocol) IP assignment followed by link-local IP (address block 169.254.0.0/16) as a fallback mechanism for IP address assignment between DMS and the DMP client (IP clients such as game consoles, mobile devices, etc.). However, current IP addressing techniques create several unresolved issues. For example, the Ethernet port of a STB is expected to be open for forming a network without using an intermediate device such as a router. However, complications arise when different types of client devices may be connected to the STB via the Ethernet port. For example, some client devices may have DHCP capability while others may only support a link-local capability. Thus, assigning addresses to the connected client devices may become problematic. Moreover, routing issues are created by interface and address conflicts may arise when a STB uses link-local addressing over MoCA while using the same link-local address range for Ethernet. Therefore, a need exists for systems and methods enabling a seamless DLNA IP network formation between a STB Ethernet port and a retail IP client according to the best-effort model.

BRIEF DESCRIPTION OF THE DRAWINGS

Like reference numbers and designations in the various drawings indicate like elements.

DETAILED DESCRIPTION

It is desirable to improve upon methods and systems for assigning a network address for a client device connected to a multimedia device. Methods, systems, and computer readable media can be operable to facilitate dynamic address assignment for various client types. A multimedia device may attempt to assign an IP address to a client device according to a received DHCP discovery message. In the event a DHCP discovery message is not received, the multimedia device may attempt DHCP assignment using an associated DHCP server. If no DHCP server is available, the multimedia device may determine any multiple interface routing conflicts for a link-local range. If multiple interfaces exist within the link-local range, then the multimedia device may initiate a manual IP configuration of the client device. If no multiple interface routing conflicts exist, the multimedia device may configure a standard link-local DLNA network for streaming content to the client device.

An embodiment of the IP address assignment mechanism described herein may be utilized by a DLNA set-top box (STB) server in the address assignment for a DLNA retail IP client, thereby addressing multi-interface issues and making sure that a DLNA IP network is formed with a best effort model. Methods and systems described herein may reduce user intervention and enable a seamless retail client IP network formation when the client is connected to a multimedia device (e.g., STB) interface.

An embodiment of the invention described herein may include a method comprising: (a) outputting a dynamic host configuration protocol (DHCP) discovery message from a multimedia device when a client device is connected to the multimedia device; (b) if a response to the DHCP discovery message is received at the multimedia device from a DHCP server associated with the client device, forming a DLNA network between the multimedia device and the client device, wherein forming the DLNA network comprises assigning an Internet protocol (IP) address to the client device, the IP address being determined based on a DHCP IP address range associated with the DHCP server that is associated with the client device; and (c) if a response to the DHCP discovery message is not received at the multimedia device from a DHCP server associated with the client device, assigning a link-local address to the client device.

According to an embodiment of the invention, assigning a link-local address to the client device comprises: (a) determining whether multiple interfaces on a link-local range exist at the multimedia device; (b) if multiple interfaces on the link-local range do not exist at the multimedia device, forming a standard link-local DLNA network between the multimedia device and the client device; and (c) if multiple interfaces on the link-local range do exist at the multimedia device: (i) outputting a user interface prompting a user to input a valid IP address for the client device; (ii) receiving a user input IP address for the client device; and (iii) assigning the user input IP address to the client device.

According to an embodiment of the invention, the determination whether multiple interfaces exist on the link-local range at the multimedia device is made based on whether a home media architecture feature is enabled at the multimedia device.

According to an embodiment of the invention, the user interface comprises a range of valid IP addresses.

According to an embodiment of the invention, at least one of the multiple interfaces comprises a MoCA (multimedia over coax alliance) interface.

According to an embodiment of the invention, the method described herein further comprises periodically monitoring for a DHCP server associated with the client device.

According to an embodiment of the invention, the client device is connected to the multimedia device via an Ethernet port at the multimedia device.

According to an embodiment of the invention, the method described herein further comprises: (a) if a response to the DHCP discovery message is not received at the multimedia device from a DHCP server associated with the client device, initiating a DHCP server on the multimedia device to listen for a DHCP discovery message from the client device; (b) if a DHCP discovery message is received at the multimedia device from the client device, forming a DLNA network between the multimedia device and the client device, wherein forming the DLNA network comprises assigning an Internet protocol (IP) address to the client device, the IP address being determined based on a DHCP IP address range associated with the DHCP server that is associated with the multimedia device; and (c) wherein, a link-local address is assigned to the client device if a response to the DHCP discovery message is not received at the multimedia device from a DHCP server associated with the client device and a DHCP discovery request is not received by the multimedia device from the client device.

An embodiment of the invention described herein may include an apparatus comprising: (a) one or more interfaces configured to be used to: (i) connect to a client device; and (ii) output a dynamic host configuration protocol (DHCP) discovery message when a client device is connected at one or more of the one or more interfaces; (b) an address module configured to: (i) if a response to the DHCP discovery message is received at the multimedia device from a DHCP server associated with the client device, form a DLNA network between the multimedia device and the client device, wherein forming the DLNA network comprises assigning an Internet protocol (IP) address to the client device, the IP address being determined based on a DHCP IP address range associated with the DHCP server that is associated with the client device; and (ii) if a response to the DHCP discovery message is not received at the multimedia device from a DHCP server associated with the client device, assign a link-local address to the client device.

According to an embodiment of the invention, the address module is further configured to periodically monitor for a DHCP server associated with the client device.

An embodiment of the invention described herein may include one or more non-transitory computer readable media having instructions operable to cause one or more processors to perform the operations comprising: (a) outputting a dynamic host configuration protocol (DHCP) discovery message from a multimedia device when a client device is connected to the multimedia device; (b) if a response to the DHCP discovery message is received at the multimedia device from a DHCP server associated with the client device, forming a DLNA network between the multimedia device and the client device, wherein forming the DLNA network comprises assigning an Internet protocol (IP) address to the client device, the IP address being determined based on a DHCP IP address range associated with the DHCP server that is associated with the client device; and (c) if a response to the DHCP discovery message is not received at the multimedia device from a DHCP server associated with the client device, assigning a link-local address to the client device.

According to an embodiment of the invention, the instructions are further operable to cause one or more processors to perform the operations comprising periodically monitoring for a DHCP server associated with the client device.

Figure 1:
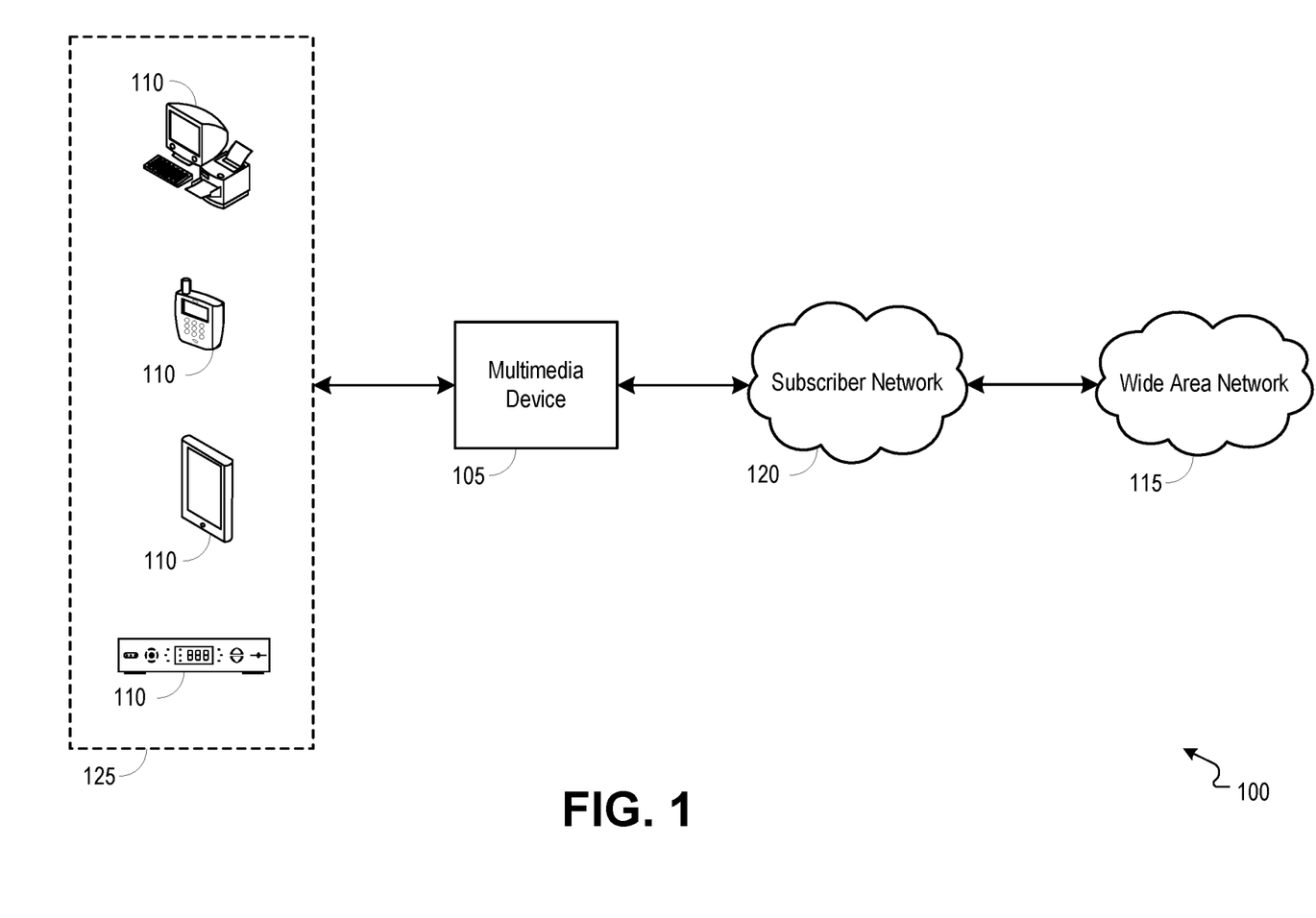
FIG. 1 is a block diagram illustrating an example network environment operable to facilitate dynamic address assignment for various client types.

FIG. 1 is a block diagram illustrating an example network environment 100 operable to facilitate dynamic address assignment for various client types. In embodiments, one or more multimedia devices 105 (e.g., set-top box (STB), multimedia gateway device, DLNA multimedia device, etc.) may provide video, data and/or voice services to one or more client devices 110 by communicating with a wide area network (WAN) 115 through a connection to a subscriber network 120 (e.g., a local area network (LAN), a wireless local area network (WLAN), a personal area network (PAN), mobile network, high-speed wireless network, etc.). For example, a subscriber can receive and request video, data and/or voice services through a variety of types of client devices 110, including but not limited to a television, computer, tablet, mobile device, STB, game console, and others. It should be understood that a multimedia device 105 may communicate directly with, and receive one or more services directly from a subscriber network 120 or WAN 115. A client device 110 may receive the requested services through a connection to a multimedia device 105, through a direct connection to a subscriber network 120 (e.g., mobile network), through a direct connection to a WAN 115, or through a connection to a local network 125 that is provided by a multimedia device 105 or other access point within an associated premise. While the components shown in FIG. 1 are shown separate from each other, it should be understood that the various components can be integrated into each other.

In embodiments, video services can be delivered from a multimedia device 105 to a client device 110 via DLNA streaming using HTTP. Using DLNA streaming, a single multimedia source file may be encoded and output as a single stream with varying bit rates. The bit rate may indicate the number of bits used per unit of playback time of the associated multimedia content. For example, the bit rate of a stream may be based upon the quality of the content rendition carried by the stream (e.g., higher quality rendition of content is streamed at a higher bit rate while lower quality rendition of content is streamed at a lower bitrate). Factors affecting the quality of content carried by a stream may include resolution, sampling frequency, encoding schemes, compression algorithms, and others.

In embodiments, client devices 110 may request and receive content from a multimedia device 105. Content available on a multimedia device 105 (e.g., live channels, stored content, etc.) can be exposed to and identified by client devices 110 using a channel or content directory (e.g., content directory service (CDS)). For example, a client device 110 may receive a channel or content directory and a subscriber can browse the directory for available channels or content. Using the content directory, a subscriber may select a channel or content for delivery from a multimedia device 105 to a client device 110. A requested channel or piece of content may be delivered to and received by a client device 110 via one or more frequencies associated with a program and/or one or more Internet protocol (IP) packet streams. As an example, a client device 110 may request channels or content from a multimedia device 105 by transmitting uniform resource identifier (URI) requests (e.g., Hypertext Transfer Protocol (HTTP) "get" request) to the multimedia device 105, the URI requests being associated with specific channels or content available at the multimedia device 105.

In embodiments, a multimedia device 105 may be connected to various types of client devices 110, wherein the different client device types may be configured to communicate and associate/connect with the multimedia device 105 using different methods, techniques, standards, and/or protocols. As an example, a client device 110 that is physically (via wires or wirelessly) connected to a multimedia device 105 may include a DHCP server for use in determining an Internet protocol (IP) address for the client device 110, or the client device 110 may operate as a DHCP client dependent on a DHCP server existing at the multimedia device 105 for assigning a valid IP address to the client device 110, or the client device 110 may require assignment of an IP address via a link-local address technique. The multimedia device 105 may be configured to determine which IP address assignment technique is to be used for a connected client device 110, and the multimedia device 105 may facilitate an IP address assignment accordingly.

In embodiments, when a client device 110 is connected to an interface of the multimedia device 105 (e.g., the Ethernet port of a STB), the multimedia device 105 may be configured to determine whether the connected client device 110 is providing a DHCP (dynamic host configuration protocol) server by outputting a DHCP discovery message. If a response to the DHCP discovery message is successfully received at the multimedia device 105 (e.g., a DHCP server associated with the connected client device 110 responds), the multimedia device 105 (e.g., a digital media server (DMS)) may form a DLNA (digital living network alliance) IP network according to a DHCP range associated with the DHCP server. If DHCP fails or no response to the DHCP discovery message is received within a predetermined timeout duration, the multimedia device 105 may consider the connected client device 110 to be a retail client relying on either DHCP client or link-local capability.

If the multimedia device 105 determines that the connected client device 110 is reliant upon either DHCP client or link-local capability, the multimedia device 105 may initiate a DHCP server and may monitor communications for a predetermined timeout duration to search for a DHCP discovery message. If a DHCP discovery message is received at the multimedia device 105 from the connected client device 110 within the predetermined timeout duration, the multimedia device 105 may determine that the connected client device 110 is a DHCP client, and the multimedia device 105 may form a DHCP network per a DHCP range associated with the client DHCP.

In embodiments, if no DHCP discovery message is received by the multimedia device 105 from the connected client device 110 within the predetermined timeout duration, the multimedia device 105 may enter a link-local addressing mode. While operating in the link-local addressing mode, the multimedia device 105 may determine whether multiple interfaces using a link-local range exist at the multimedia device 105. For example, the multimedia device 105 may determine whether a HMA (home media architecture) tier is enabled (e.g., home networking is enabled) at the multimedia device 105, and whether another interface (e.g., MoCA (multimedia over coax alliance)) is active. If the multimedia device 105 determines that the HMA tier is enabled and that another interface is active, the multimedia device 105 may generate and output a user interface as a display at a display device or other client device 110. The user interface may prompt a user to input an IP address to be assigned to the client device 110. The user interface may include an identification of a valid IP address range (e.g., standard private IP range) within which the IP address assigned to the client device 110 should fall. A best effort model may be utilized when assigning the user input IP address to the client device 110.

In embodiments, while the multimedia device 105 is operating in the link-local addressing mode, if the determination is made that an interface of the multiple interfaces (e.g., the MoCA link) is currently unavailable or disabled, the multimedia device 105 may form a temporary link-local DLNA network with the client device 110. If the interface (e.g., the MoCA link) then becomes available or is enabled at a later time, the multimedia device 105 may tear down the temporary link-local DLNA network and may generate and output a user interface to a display device, the user interface prompting a user to input an IP address to be assigned to the client device 110.

In embodiments, while the multimedia device 105 is operating in the link-local addressing mode, if the determination is made that multiple interfaces do not exist on the link-local range at the multimedia device 105, the multimedia device 105 may determine that a conflicting interface does not exist on the multimedia device 105, and the multimedia device 105 may form a standard link-local DLNA network with the client device 110. As an example, the multimedia device 105 may determine that multiple interfaces do not exist when an HMA tier is disabled (say for a standalone STB or other client device 110 that has not subscribed to an HMA capability or streaming feature such as a multi-room DVR feature).

After forming a DLNA network or link-local network with a client device 110, the multimedia device 105 may periodically monitor for a DHCP server. For example, the multimedia device 105 may periodically (e.g., five (5) minutes or other predetermined period of time) check for DHCP discovery messages.

Figure 2:
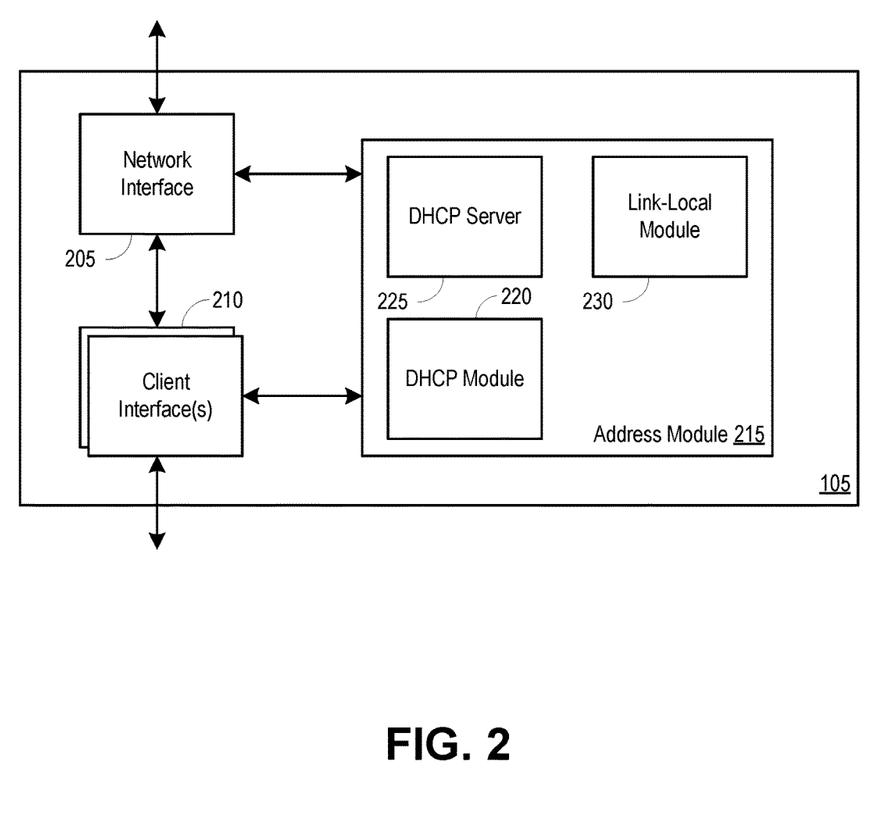
FIG. 2 is a block diagram illustrating an example multimedia device operable to facilitate dynamic address assignment for various client types.

FIG. 2 is a block diagram illustrating an example multimedia device 105 operable to facilitate dynamic address assignment for various client types. The multimedia device 105 may include a network interface 205, one or more client interfaces 210, and an address module 215. The multimedia device 105 may receive one or more services, messages, and/or configuration upgrades from one or more upstream network elements through the network interface 205, and the multimedia device 105 may forward one or more services to one or more client devices 110 of FIG. 1 through the client interface(s) 210.

In embodiments, when a client device 110 is connected to a client interface 210 (e.g., an Ethernet port), the address module 215 may be configured to determine whether the connected client device 110 is providing a DHCP (dynamic host configuration protocol) server. For example, the address module 215 may include a DHCP module 220, and the DHCP module may output a DHCP discovery message. If a response to the DHCP discovery message is successfully received at the address module 215 (e.g., a DHCP server associated with the connected client device 110 responds), the address module 215 may form a DLNA (digital living network alliance) IP network according to a DHCP range associated with the DHCP server. If DHCP fails or no response to the DHCP discovery message is received within a predetermined timeout duration, the address module 215 may consider the connected client device 110 to be a retail client relying on either DHCP client or link-local capability.

If the address module 215 determines that the connected client device 110 is reliant upon either DHCP client or link-local capability, the address module 215 may initiate a DHCP server 225 and may monitor communications for a predetermined timeout duration to search for a DHCP discovery message. The DHCP server 225 may be located at the multimedia device 105 (e.g., within the address module 215). If a DHCP discovery message is received at the address module 215 from the connected client device 110 within the predetermined timeout duration, the address module 215 may determine that the connected client device 110 is a DHCP client, and the address module 215 may form a DHCP network per a DHCP range associated with the client DHCP.

In embodiments, if no DHCP discovery message is received by the address module 215 from the connected client device 110 within the predetermined timeout duration, the address module 215 may enter a link-local addressing mode. The address module 215 may include a link-local module 230. While operating in the link-local addressing mode, the link-local module 230 may determine whether multiple interfaces using a link-local range exist at the multimedia device 105. For example, the link-local module 230 may determine whether a HMA (home media architecture) tier is enabled (e.g., home networking is enabled) at the multimedia device 105, and whether the other interface (e.g., MoCA (multimedia over coax alliance)) is active. If the link-local module 230 determines that the HMA tier is enabled and that the other interface is active, the link-local module 230 may generate and output a user interface as a display at a display device or other client device 110. The user interface may prompt a user to input an IP address to be assigned to the client device 110. The user interface may include an identification of a valid IP address range (e.g., standard private IP range) within which the IP address assigned to the client device 110 should fall. A best effort model may be utilized when assigning the user input IP address to the client device 110.

In embodiments, while the multimedia device 105 is operating in the link-local addressing mode, if the determination is made that an interface of the multiple interfaces (e.g., the MoCA link) is currently unavailable or disabled, the link-local module 230 may form a temporary link-local DLNA network with the client device 110. If the interface (e.g., the MoCA link) then becomes available or is enabled at a later time, the link-local module 230 may tear down the temporary link-local DLNA network and may generate and output a user interface to a display device, the user interface prompting a user to input an IP address to be assigned to the client device 110.

In embodiments, while the multimedia device 105 is operating in the link-local addressing mode, if the determination is made that multiple interfaces do not exist on the link-local range at the multimedia device 105, the link-local module 230 may determine that a conflicting interface does not exist on the multimedia device 105, and the link-local module 230 may form a standard link-local DLNA network with the client device 110. As an example, the link-local module 230 may determine that multiple interfaces do not exist when an HMA tier is disabled (say for a standalone STB or other client device 110 that has not subscribed to an HMA capability or streaming feature such as a multi-room DVR feature).

After forming a DLNA network or link-local network with a client device 110, the address module 215 may periodically monitor for a DHCP server. For example, the address module 215 may periodically (e.g., five (5) minutes or other predetermined period of time) check for DHCP discovery messages.

Figure 3:
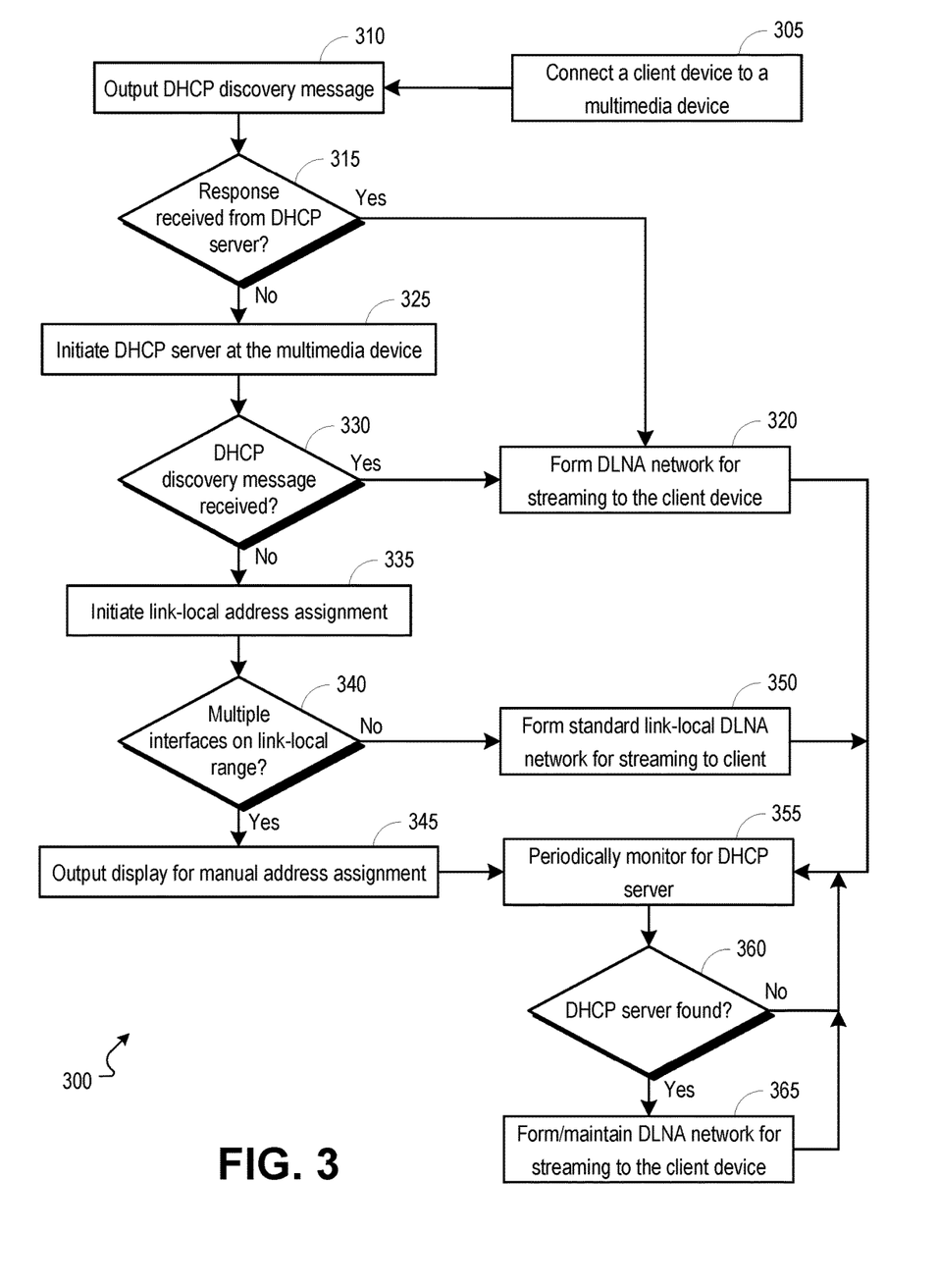
FIG. 3 is a flowchart illustrating an example process operable to facilitate dynamic address assignment for various client types.

FIG. 3 is a flowchart illustrating an example process 300 operable to facilitate dynamic address assignment for various client types. The process 300 may be carried out, for example, by a multimedia device 105 of FIG. 1 or any other device configured to deliver multimedia to one or more client devices 110 of FIG. 1. The process 300 can begin at 305, when a client device (e.g., client device 110) is connected to a multimedia device (e.g., multimedia device 105 such as a STB). In embodiments, the client device may be connected to the multimedia device via a client interface 210 of FIG. 2. For example, the client device may be connected to the multimedia device via an Ethernet port of the multimedia device.

At 310, a DHCP discovery message may be output. The DHCP discovery message may be output, for example, by the multimedia device (e.g., by the DHCP module 220 of FIG. 2). In embodiments, the DHCP discovery may be output from the multimedia device in an attempt to provoke a response from a DHCP server associated with the client device.

At 315, a determination may be made whether a response to the DHCP discovery message is received from a DHCP server associated with the client device. The determination whether a response is received from a DHCP server associated with the client device may be made, for example, by the multimedia device (e.g., by the address module 215 of FIG. 2). If a response is received at the multimedia device from a DHCP server associated with the client device, the multimedia device may determine that the client device has the capability to generate an address (e.g., IP address) using the DHCP server. If a response is not received at the multimedia device from a DHCP server associated with the client device, the multimedia device may determine that the client device is not capable of generating an address using a DHCP server and that the client device is capable of receiving an address using either a DHCP client or link-local technique.

If, at 315, the determination is made that a response is received from a DHCP server associated with the client device, the process 300 may proceed to 320. At 320, a DLNA network may be formed for use in streaming content from the multimedia device to the client device. The DLNA network may be formed, for example, by the multimedia device (e.g., by the address module 215 of FIG. 2). In embodiments, a digital media server (DMS) may be accessed by the multimedia device to form a DLNA IP network with the client device per a DHCP range associated with the DHCP server that is associated with the client device. For example, DMS services may be accessed by the client device and the DMS may retrieve information associated with the client device (e.g., client device descriptions or attributes). Using the information associated with the client device, the client device and DMS may initiate and maintain a DLNA IP network.

If, at 315, the determination is made that a response is not received from a DHCP server associated with the client device, the process 300 may proceed to 325. At 325, a DHCP server may be initiated at the multimedia device. For example, the DHCP server 225 of FIG. 2 may be initiated and may monitor communications received at the multimedia device for a DHCP discovery message. In embodiments, the DHCP server 225 may monitor communications for a DHCP discovery message from the client device for a predetermined duration of time (e.g., a timeout duration).

At 330, a determination may be made whether a DHCP discovery message is received at the multimedia device from the client device. The determination whether a DHCP discovery message is received may be made, for example, by the address module 215 of FIG. 2 (e.g., at the DHCP module 210 of FIG. 2). If a DHCP discovery message is received at the multimedia device from the client device within a predetermined timeout duration, the multimedia device may determine that an address may be determined for the client device using a DHCP client technique. If a DHCP discovery message is not received at the multimedia device from the client device within a predetermined timeout duration, the multimedia device may determine that an address may be determined using a link-local technique.

If, at 330, the determination is made that a DHCP discovery message is received from the client device, the process 300 may proceed to 320. At 320, a DLNA network may be formed for use in streaming content from the multimedia device to the client device. The DLNA network may be formed, for example, by the multimedia device (e.g., by the address module 215 of FIG. 2). In embodiments, a digital media server (DMS) may be accessed by the multimedia device to form a DLNA IP network with the client device per a DHCP range associated with the DHCP server associated with the multimedia device (e.g., DHCP server 225 of FIG. 2).

If, at 330, the determination is made that a DHCP discovery message is not received from the client device, the process 300 may proceed to 335. At 335, link-local address assignment may be initiated.

At 340, a determination may be made whether multiple interfaces exist on a link-local range of the multimedia device. The determination whether multiple interfaces exist on a link-local range of the multimedia device may be made, for example, by the link-local module 230 of FIG. 2. In embodiments, the determination whether multiple interfaces exist on a link-local range of the multimedia device may be based upon whether home networking (e.g., HMA (home media architecture) tier) is enabled at the multimedia device and whether another interface (e.g., MoCA (multimedia over coax alliance) interface) is active or may be made active.

If, at 340, the determination is made that multiple interfaces do exist on the link-local range of the multimedia device, the process 300 may proceed to 345. At 345, a display of a user interface for manual address assignment may be output. The user interface display may be output, for example, by the address module 215 of FIG. 2. In embodiments, the display may be output to a display device associated with the multimedia device (e.g., a television or other client device 110 of FIG. 1). The display may prompt a user to manually input an IP address for the client device connected to the multimedia device. The display may identify a certain range (e.g., standard private IP range) within which the IP address of the client device should be assigned. After receiving user input of a valid IP address in the displayed user interface, the multimedia device (e.g., the address module 215) may assign the valid IP address to the client device and may begin to deliver one or more services to the client device. For example, the multimedia device may offer services to the client device at a best effort model.

If, at 340, the determination is made that multiple interfaces do not exist on the link-local range of the multimedia device, the process 300 may proceed to 350. At 350, a standard link-local DLNA network may be formed for use in streaming content from the multimedia device to the client device. The link-local DLNA network may be formed, for example, by the multimedia device (e.g., by the address module 215 of FIG. 2). In embodiments, the multimedia device (e.g., the link-local module 230 of FIG. 2) may assign a link-local IP address to the client device.

At 355, the multimedia device may periodically monitor communications for a communication from a DHCP server. Communications may be monitored, for example, by the address module 215 of FIG. 2. In embodiments, the address module may periodically (e.g., every five (5), ten (10) minutes, etc.) check for any communications (i.e., DHCP discovery response) received from a DHCP server associated with the client device.

At 360, a determination is made whether a DHCP server has been found by monitoring the communications. If a DHCP server is not found, the multimedia device may continue to periodically monitor for a DHCP server at 355.

If, at 360, the determination is made that a DHCP server has been found, the process 300 may proceed to 365. At 365, a DLNA network may be formed or maintained for streaming content from the multimedia device to the client device. In embodiments, if a DLNA network has not been formed for streaming to the client device, the address module 215 of FIG. 2 may assign an IP address to the client device and may form a DLNA network. If a DLNA network has been formed for streaming to the client device, the multimedia device may maintain the DLNA network upon confirmation that the DHCP server remains active.

Figure 4:
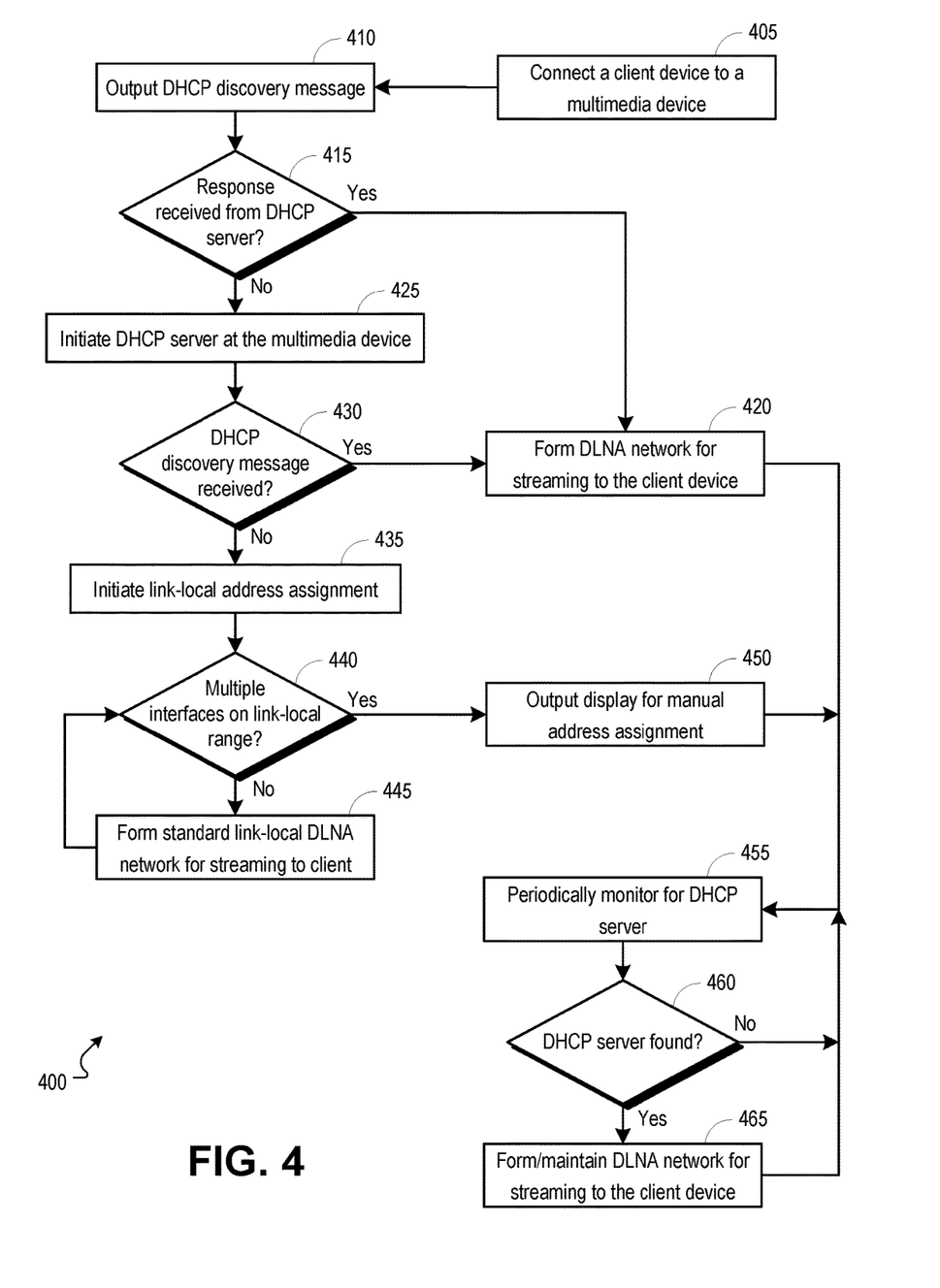
FIG. 4 is a flowchart illustrating an alternate process operable to facilitate dynamic address assignment for various client types.

FIG. 4 is a flowchart illustrating an alternate process 400 operable to facilitate dynamic address assignment for various client types. The process 400 may be carried out, for example, by a multimedia device 105 of FIG. 1 or any other device configured to deliver multimedia to one or more client devices 110 of FIG. 1. The process 400 can begin at 405, when a client device (e.g., client device 110) is connected to a multimedia device (e.g., multimedia device 105 such as a STB). In embodiments, the client device may be connected to the multimedia device via a client interface 210 of FIG. 2. For example, the client device may be connected to the multimedia device via an Ethernet port of the multimedia device.

At 410, a DHCP discovery message may be output. The DHCP discovery message may be output, for example, by the multimedia device (e.g., by the DHCP module 220 of FIG. 2). In embodiments, the DHCP discovery may be output from the multimedia device in an attempt to provoke a response from a DHCP server associated with the client device.

At 415, a determination may be made whether a response to the DHCP discovery message is received from a DHCP server associated with the client device. The determination whether a response is received from a DHCP server associated with the client device may be made, for example, by the multimedia device (e.g., by the address module 215 of FIG. 2). If a response is received at the multimedia device from a DHCP server associated with the client device, the multimedia device may determine that the client device has the capability to generate an address (e.g., IP address) using the DHCP server. If a response is not received at the multimedia device from a DHCP server associated with the client device, the multimedia device may determine that the client device is not capable of generating an address using a DHCP server and that the client device is capable of receiving an address using either a DHCP client or link-local technique.

If, at 415, the determination is made that a response is received from a DHCP server associated with the client device, the process 400 may proceed to 420. At 420, a DLNA network may be formed for use in streaming content from the multimedia device to the client device. The DLNA network may be formed, for example, by the multimedia device (e.g., by the address module 215 of FIG. 2). In embodiments, a digital media server (DMS) may be accessed by the multimedia device to form a DLNA IP network with the client device per a DHCP range associated with the DHCP server that is associated with the client device. Forming the DLNA IP network may include an accessing of DMS services by the client device such that the DMS may recover information associated with the client device (e.g., client device description, attributes, etc.). Using the client device information, the client device and DMS may initiate and maintain a DLNA IP network.

If, at 415, the determination is made that a response is not received from a DHCP server associated with the client device, the process 400 may proceed to 425. At 425, a DHCP server may be initiated at the multimedia device. For example, the DHCP server 225 of FIG. 2 may be initiated and may monitor communications received at the multimedia device for a DHCP discovery message. In embodiments, the DHCP server 225 may monitor communications for a DHCP discovery message for a predetermined duration of time (e.g., a timeout duration).

At 430, a determination may be made whether a DHCP discovery message is received at the multimedia device from the client device. The determination whether a DHCP discovery message is received may be made, for example, by the address module 215 of FIG. 2 (e.g., at the DHCP module 210 of FIG. 2). If a DHCP discovery message is received at the multimedia device from the client device within a predetermined timeout duration, the multimedia device may determine that an address may be determined for the client device using a DHCP client technique. If a DHCP discovery message is not received at the multimedia device from the client device within a predetermined timeout duration, the multimedia device may determine that an address may be determined using a link-local technique.

If, at 430, the determination is made that a DHCP discovery message is received from the client device, the process 400 may proceed to 420. At 420, a DLNA network may be formed for use in streaming content from the multimedia device to the client device. The DLNA network may be formed, for example, by the multimedia device (e.g., by the address module 215 of FIG. 2). In embodiments, a digital media server (DMS) may be accessed by the multimedia device to form a DLNA IP network with the client device per a DHCP range associated with the DHCP server that is associated with the multimedia device (e.g., DHCP server 225 of FIG. 2).

If, at 430, the determination is made that a DHCP discovery message is not received from the client device, the process 400 may proceed to 435. At 435, link-local address assignment may be initiated.

At 440, a determination may be made whether multiple interfaces exist on a link-local range of the multimedia device. The determination whether multiple interfaces exist on a link-local range of the multimedia device may be made, for example, by the link-local module 230 of FIG. 2. In embodiments, the determination whether multiple interfaces exist on a link-local range of the multimedia device may be based upon whether home networking (e.g., HMA (home media architecture) tier) is enabled at the multimedia device and whether another interface (e.g., MoCA (multimedia over coax alliance) interface) is active or may be made active.

If, at 440, the determination is made that multiple interfaces do not exist on the link-local range of the multimedia device, the process 400 may proceed to 445. At 445, a standard link-local DLNA network may be formed for use in streaming content from the multimedia device to the client device. The link-local DLNA network may be formed, for example, by the multimedia device (e.g., by the address module 215 of FIG. 2). In embodiments, the multimedia device (e.g., the link-local module 230 of FIG. 2) may assign a link-local IP address to the client device. The multimedia device may continue to monitor the status of a home networking feature of the multimedia device. For example, the multimedia device may continue to check whether multiple interfaces exist on the link-local range of the multimedia range at 440 in case a home networking feature of the multimedia device is activated/enabled.

If, at 440, the determination is made that multiple interfaces do exist on the link-local range of the multimedia device, the process 400 may proceed to 450. At 450, a display of a user interface for manual address assignment may be output. The user interface display may be output, for example, by the address module 215 of FIG. 2. In embodiments, the display may be output to a display device associated with the multimedia device (e.g., a television or other client device 110 of FIG. 1). The display may prompt a user to manually input an IP address for the client device connected to the multimedia device. The display may identify a certain range (e.g., standard private IP range) within which the IP address of the client device should be assigned. After receiving user input of a valid IP address in the displayed user interface, the multimedia device (e.g., the address module 215) may assign the valid IP address to the client device and may begin to deliver one or more services to the client device. For example, the multimedia device may offer services to the client device at a best effort model.

At 455, the multimedia device may periodically monitor communications for a communication from a DHCP server. Communications may be monitored, for example, by the address module 215 of FIG. 2. In embodiments, the address module may periodically (e.g., every five (5), ten (10) minutes, etc.) check for any communications (i.e., DHCP discovery response) received from a DHCP server associated with the client device.

At 460, a determination is made whether a DHCP server has been found by monitoring the communications. If a DHCP server is not found, the multimedia device may continue to periodically monitor for a DHCP server at 455.

If, at 460, the determination is made that a DHCP server has been found, the process 400 may proceed to 465. At 465, a DLNA network may be formed or maintained for streaming content from the multimedia device to the client device. In embodiments, if a DLNA network has not been formed for streaming to the client device, the address module 215 of FIG. 2 may assign an IP address to the client device and may form a DLNA network. If a DLNA network has been formed for streaming to the client device, the multimedia device may maintain the DLNA upon confirmation that the DHCP server remains active.

Figure 5:
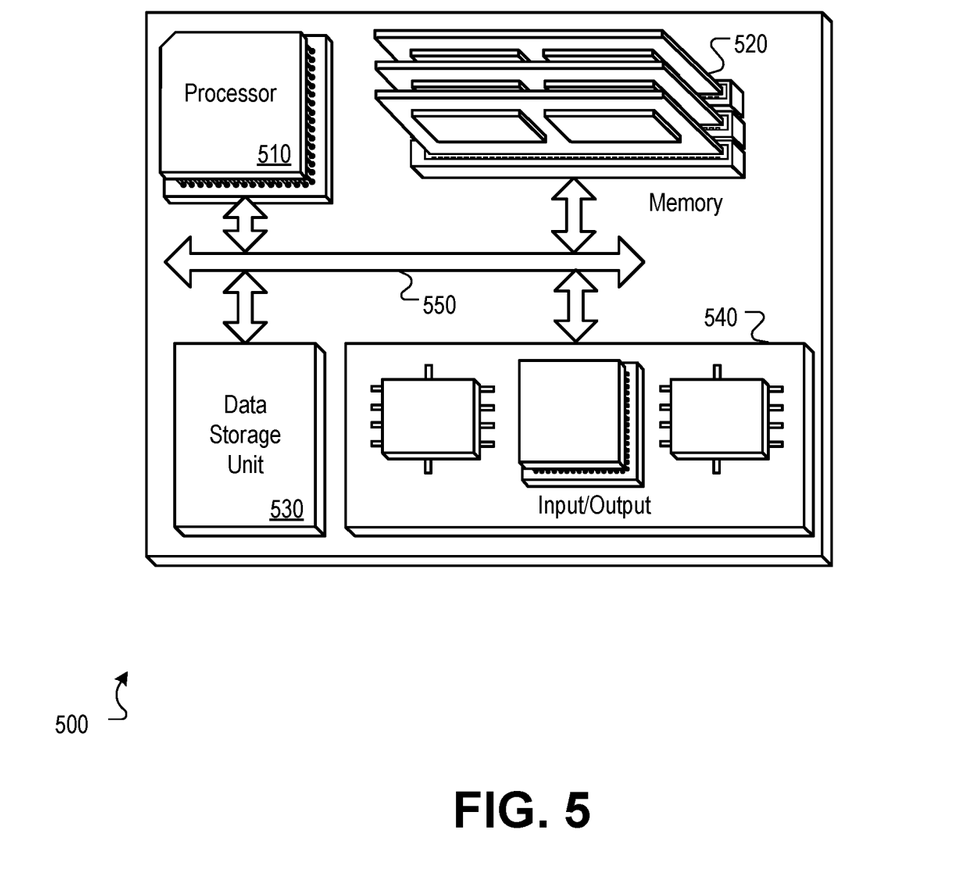
FIG. 5 is a block diagram of a hardware configuration operable to facilitate dynamic address assignment for various client types.

FIG. 5 is a block diagram of a hardware configuration 500 operable to facilitate dynamic address assignment for various client types. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 110 of FIG. 1 (e.g., television, mobile device, tablet, computer, game console, STB, etc.). In another implementation, the input/output device can include driver devices configured to send communications to, and receive communications from one or more networks (e.g., subscriber network 120 of FIG. 1, WAN 115 of FIG. 1, local network 125 of FIG. 1, etc.).

Those skilled in the art will appreciate that the invention improves upon methods and systems for assigning a network address for a client device connected to a multimedia device. Methods, systems, and computer readable media can be operable to facilitate dynamic address assignment for various client types. A multimedia device may attempt to assign an IP address to a client device according to a received DHCP discovery message. In the event a DHCP discovery message is not received, the multimedia device may attempt DHCP assignment using an associated DHCP server. If no DHCP server is available, the multimedia device may determine any multiple interface routing conflicts for a link-local range. If multiple interfaces exist within the link-local range, then the multimedia device may initiate a manual IP configuration of the client device. If no multiple interface routing conflicts exist, the multimedia device may configure a standard link-local DLNA network for streaming content to the client device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
    outputting a dynamic host configuration protocol (DHCP) discovery message from a multimedia device when a client device is connected to the multimedia device;
    if a response to the DHCP discovery message is received at the multimedia device from a DHCP server associated with the client device, forming a DLNA network between the multimedia device and the client device, wherein forming the DLNA network comprises assigning an Internet protocol (IP) address to the client device, the IP address being determined based on a DHCP IP address range associated with the DHCP server that is associated with the client device; and
    if a response to the DHCP discovery message is not received at the multimedia device from a DHCP server associated with the client device, initiating a DHCP server on the multimedia device to listen for a DHCP discovery message from the client device; and
        if a DHCP discovery message is received at the multimedia device from the client device, forming a DLNA network between the multimedia device and the client device, wherein forming the DLNA network comprises assigning an Internet protocol (IP) address to the client device, the IP address being determined based on a DHCP IP address range associated with the DHCP server that is associated with the multimedia device; and
        assigning a link-local address to the client device if a response to the DHCP discovery message is not received at the multimedia device from a DHCP server associated with the client device and a DHCP discovery request is not received by the multimedia device from the client device, wherein assigning a link-local address to the client device comprises:
            determining whether multiple interfaces on a link-local range exist at the multimedia device;
            if multiple interfaces on the link-local range do not exist at the multimedia device, forming a standard link-local DLNA network between the multimedia device and the client device; and
            if multiple interfaces on the link-local range do exist at the multimedia device:
                outputting a user interface prompting a user to input a valid IP address for the client device;
                receiving a user input IP address for the client device; and
                assigning the user input IP address to the client device.

2. The method of claim 1, wherein the determination whether multiple interfaces exist on the link-local range at the multimedia device is made based on whether a home media architecture feature is enabled at the multimedia device.

3. The method of claim 1, wherein the user interface comprises a range of valid IP addresses.

4. The method of claim 1, wherein at least one of the multiple interfaces comprises a MoCA (multimedia over coax alliance) interface.

5. The method of claim 1, further comprising: periodically monitoring for a DHCP server associated with the client device.

6. The method of claim 1, wherein the client device is connected to the multimedia device via an Ethernet port at the multimedia device.

7. An apparatus comprising:
    a processor device;
    a memory;
    one or more interfaces configured to be used to:
        connect to a client device; and
        output a dynamic host configuration protocol (DHCP) discovery message when a client device is connected at one or more of the one or more interfaces;
    an address module configured to:
    if a response to the DHCP discovery message is received at the multimedia device from a DHCP server associated with the client device, form a DLNA network between the multimedia device and the client device, wherein forming the DLNA network comprises assigning an Internet protocol (IP) address to the client device, the IP address being determined based on a DHCP IP address range associated with the DHCP server that is associated with the client device; and
    if a response to the DHCP discovery message is not received at the multimedia device from a DHCP server associated with the client device, initiate a DHCP server on the multimedia device to listen for a DHCP discovery message from the client device; and
    if a DHCP discovery message is received at the multimedia device from the client device, form a DLNA network between the multimedia device and the client device, wherein forming the DLNA network comprises assigning an Internet protocol (IP) address to the client device, the IP address being determined based on a DHCP IP address range associated with the DHCP server that is associated with the multimedia device; and
    assign a link-local address to the client device if a response to the DHCP discovery message is not received at the multimedia device from a DHCP server associated with the client device and a DHCP discovery request is not received by the multimedia device from the client device, wherein assigning a link-local address to the client device comprises:

determining whether multiple interfaces on a link-local range exist at the multimedia device;

if multiple interfaces on the link-local range do not exist at the multimedia device, forming a standard link-local DLNA network between the multimedia device and the client device; and if multiple interfaces on the link-local range do exist at the multimedia device:

outputting a user interface prompting a user to input a valid IP address for the client device;

receiving a user input IP address for the client device; and assigning the user input IP address to the client device.

8. The apparatus of claim 7, wherein the determination whether multiple interfaces exist on the link-local range at the multimedia device is made based on whether a home media architecture feature is enabled at the multimedia device.

9. The apparatus of claim 7, wherein the user interface comprises a range of valid IP addresses.

10. The apparatus of claim 7, wherein at least one of the multiple interfaces comprises a MoCA (multimedia over coax alliance) interface.

11. The apparatus of claim 7, wherein the address module is further configured to: periodically monitor for a DHCP server associated with the client device.

12. One or more non-transitory computer readable media having instructions operable to cause one or more processors to perform the operations comprising:

outputting a dynamic host configuration protocol (DHCP) discovery message from a multimedia device when a client device is connected to the multimedia device;

if a response to the DHCP discovery message is received at the multimedia device from a DHCP server associated with the client device, forming a DLNA network between the multimedia device and the client device, wherein forming the DLNA network comprises assigning an Internet protocol (IP) address to the client device, the IP address being determined based on a DHCP IP address range associated with the DHCP server that is associated with the client device; and if a response to the DHCP discovery message is not received at the multimedia device from a DHCP server associated with the client device, initiating a DHCP server on the multimedia device to listen for a DHCP discovery message from the client device; and if a DHCP discovery message is received at the multimedia device from the client device, forming a DLNA network between the multimedia device and the client device, wherein forming the DLNA network comprises assigning an Internet protocol (IP) address to the client device, the IP address being determined based on a DHCP IP address range associated with the DHCP server that is associated with the multimedia device; and assigning a link-local address to the client device if a response to the DHCP discovery message is not received at the multimedia device from a DHCP server associated with the client device and a DHCP discovery request is not received by the multimedia device from the client device, wherein assigning a link-local address to the client device comprises:

determining whether multiple interfaces on a link-local range exist at the multimedia device;

if multiple interfaces on the link-local range do not exist at the multimedia device, forming a standard link-local DLNA network between the multimedia device and the client device; and if multiple interfaces on the link-local range do exist at the multimedia device:

outputting a user interface prompting a user to input a valid IP address for the client device:

receiving a user input IP address for the client device; and assigning the user input IP address to the client device.

13. The one or more non-transitory computer-readable media of claim 12, wherein the determination whether multiple interfaces exist on the link-local range at the multimedia device is made based on whether a home media architecture feature is enabled at the multimedia device.

14. The one or more non-transitory computer-readable media of claim 12, wherein the user interface comprises a range of valid IP addresses.

15. The one or more non-transitory computer-readable media of claim 12, wherein at least one of the multiple interfaces comprises a MoCA (multimedia over coax alliance) interface.

* * * * *